(12) United States Patent
Chaudhuri et al.

(10) Patent No.: US 8,386,529 B2
(45) Date of Patent: Feb. 26, 2013

(54) FOREIGN-KEY DETECTION

(75) Inventors: Surajit Chaudhuri, Redmond, WA (US); Vivek R. Narasayya, Redmond, WA (US); Zhimin Chen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 12/709,508

(22) Filed: Feb. 21, 2010

(65) Prior Publication Data

US 2011/0208748 A1    Aug. 25, 2011

(51) Int. Cl.
*G06F 17/30* (2006.01)
(52) U.S. Cl. ......................................... 707/802; 707/748
(58) Field of Classification Search .................. 707/802, 707/748
See application file for complete search history.

(56) References Cited

U.S. PATENT DOCUMENTS

| | | | |
|---|---|---|---|
| 6,823,334 B2 * | 11/2004 | Vishnubhotla et al. | 1/1 |
| 7,072,896 B2 | 7/2006 | Lee et al. | |
| 7,426,520 B2 * | 9/2008 | Gorelik et al. | 1/1 |
| 2005/0055369 A1 * | 3/2005 | Gorelik et al. | 707/102 |
| 2007/0005658 A1 * | 1/2007 | Myllymaki | 707/200 |
| 2007/0156736 A1 | 7/2007 | Bestgen et al. | |
| 2007/0179959 A1 | 8/2007 | Sharma et al. | |
| 2008/0189677 A1 | 8/2008 | Cote et al. | |
| 2009/0106286 A1 | 4/2009 | Chakraborty et al. | |
| 2009/0265335 A1 * | 10/2009 | Hoffman et al. | 707/5 |

OTHER PUBLICATIONS

"Identifying Foreign Keys", Retrieved at <<http://publib.boulder.ibm.com/infocenter/iisinfsv/v8r0/index.jsp?topic=/com.ibm.swg.im.iis.ia.profile.doc/topics/t_fk_identifying_the_fk_candidates.html>>, Aug. 7, 2007, p. 1.

Ilyas, et al., "CORDS: Automatic Discovery of Correlations and Soft Functional Dependencies", Retrieved at <<http://dm.postech.ac.kr/seminar/cords.pdf>>, SIGMOD 2004, Jun. 13-18, 2004, Paris, France, pp. 12.

* cited by examiner

*Primary Examiner* — Cheryl Lewis

(57) ABSTRACT

This patent application relates to foreign-key detection. One implementation obtains a set of data tables. This implementation automatically determines foreign-key relationships of columns from separate tables of the set.

20 Claims, 6 Drawing Sheets

FOREIGN-KEY DETECTION

BACKGROUND

A set of data tables often includes foreign-key relationships between individual data tables. Foreign-key relationships are an important class of relationships in the set. Foreign-key relationships are used to represent a many-to-one relationship and are useful to capture hierarchies of the data. For instance, data relating to sales can be organized by region, such as Region->Sales or by time, such as Year->Month->Date->Sales. Common examples of foreign-key relationships are star schemas and snowflake schemas. In a star schema there is a fact table that contains details (e.g. sales transactions) and is connected to other dimension tables (e.g. Customer, Country, Year, Store) via foreign-key relationships. A snowflake schema is similar to a star schema except that the dimension tables could be organized in hierarchies.

In certain cases, the foreign-key (FK) relationships among tables may not be declared or known a priori. In other instances, foreign-key relationships may be lost when data is moved, such as when the data is exported from one format and input into another format. In such cases, either the user has to manually identify the foreign-key relationships or the user has to accept diminished data analysis relative to the data.

SUMMARY

This patent application relates to foreign-key detection. One implementation obtains a set of data tables. This implementation automatically determines foreign-key relationships of columns from separate tables of the set.

The above listed example is intended to provide a quick reference to aid the reader and is not intended to define the scope of the concepts described and/or claimed herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application pertains to foreign-key relationships between data tables of a set. More particularly, various implementations can identify foreign-key relationships between pairs of tables.

Figure 1:
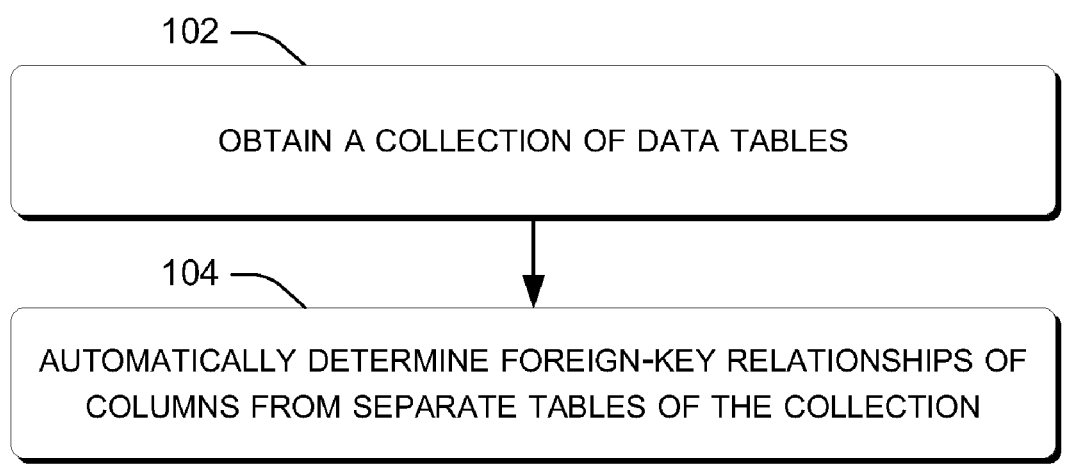
FIG. 1 shows a flowchart example of a foreign-key detection method in accordance with some implementations of the present concepts.

For discussion purposes consider FIG. 1 which shows an introductory method 100. At block 102, the method obtains a set of data tables. For instance, one such scenario can occur when a user loads the data tables into an application, such as a spreadsheet application. In such a case, any existing inter-relationships, such as foreign-key relationships between the data tables may be lost.

At block 104, the method automatically determines foreign-key relationships of columns from separate tables of the set. For example, the method can identify potential column pairs (i.e., candidate pairs). The method can then utilize pruning criteria to eliminate unlikely candidate pairs. The method can then employ a scoring function on the remaining candidates pairs. These remaining candidates pairs can be ranked based upon their respective scores. The ranking can be used to identify the candidate pairs that have a foreign-key relationship.

Figure 2:
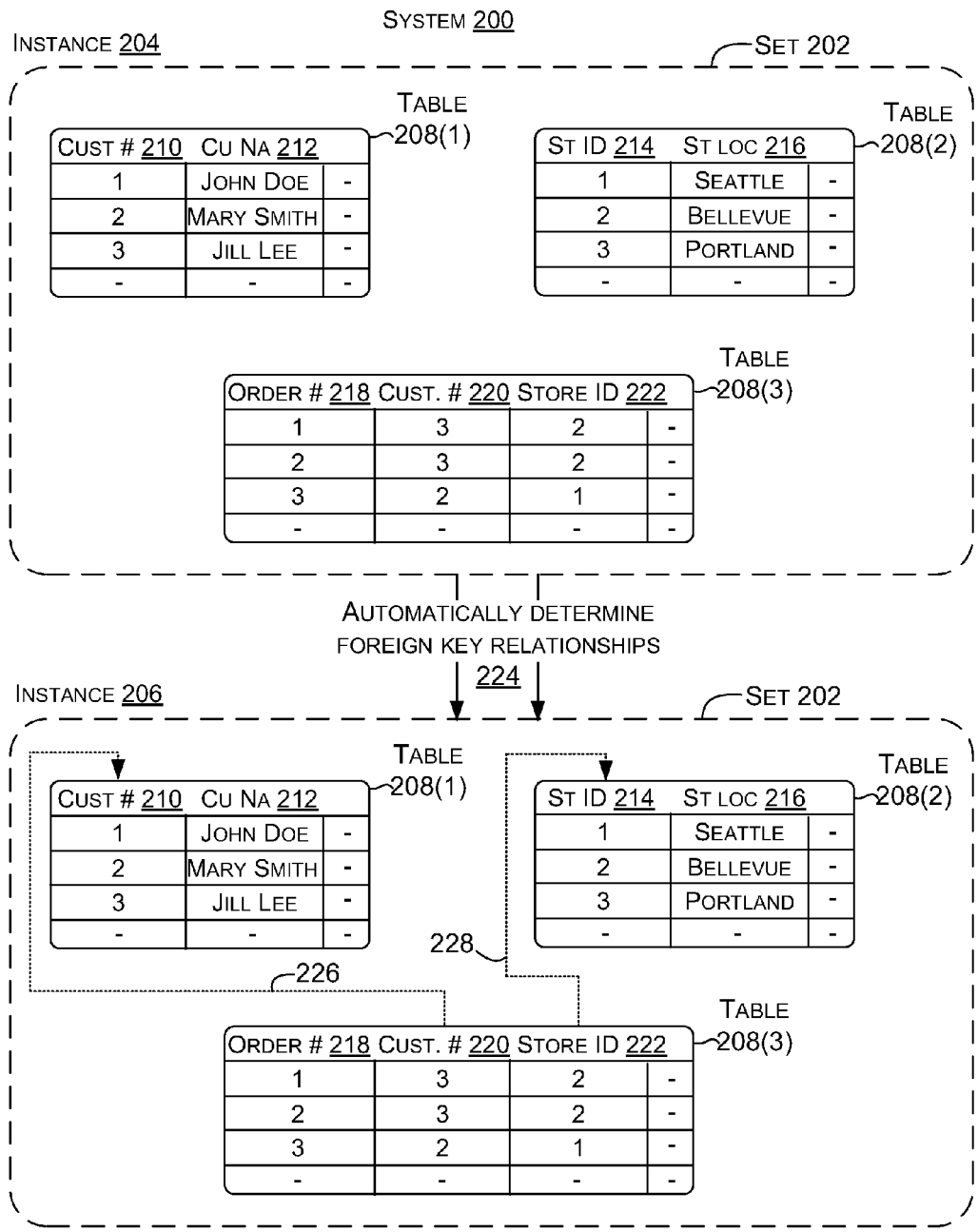
FIGS. 2-3 show examples of foreign-key detection systems in accordance with some implementations of the present concepts.

FIG. 2 shows a system 200 in which foreign-key relationships can be established between data tables. System 200 includes a set of data tables indicated at 202. The set 202 is shown in a first instance 204 and a second instance 206. In this example, the set 202 includes three data tables 208(1), 208(2), and 208(3).

Data table 208(1) includes a customer number column 210 and a customer name column 212. Data table 208(2) includes a store ID column 214 and a store location column 216. Data table 208(3) includes an order number column 218, a customer number column 220, and a store ID column 222. For the sake of brevity data tables 208(1), 208(2), and 208(3) are shown with just a few columns and a few rows each. In practice, data tables often have thousands or millions of rows and/or columns. Further, while in this example, set 202 includes three data tables, other cases could involve two or more than three data tables.

In the first instance 204, no inter-relationships between data tables 208(1)-208(3) are known. However, the system 200 can automatically determine foreign-key relationships for the set as indicated at 224. As a result, instance 206 shows foreign-key relationships between the data tables. Specifically, arrow 226 indicates that the customer number column 210 of data table 208(1) acts as a foreign-key for the customer number column 220 of data table 208(3). Similarly, arrow 228 indicates that the store ID column 214 of data table 208(2) acts as a foreign-key for the store ID column 222 of data table 208(3). It is worth noting that for ease of explanation, the same terms are used to name columns in different data tables. However, such need not be the case. Further, in many instances, column names may not even be meaningful to a human user. For instance, the column names can be randomly generated by a computer application.

In light of the foreign-key relationships shown in instance 206, data table 208(3) can be thought of as a fact table and data tables 208(1) and 208(2) can be thought of as dimension tables. A dimension table can relate to an individual column of a fact table. The present implementations can identify which table is the fact table and which table is the dimension table. Further, these implementations can identify an individual column in the dimension table that relates to an individual column in the fact table (e.g. this can be thought of as a "foreign-key" relationship). For sake of clarity, note that a foreign-key relationship can also exist between two dimension tables.

In this example, as indicated in instance 206, a first row of data table 208(3) relates to order number "1" in the order number column 218, a customer number "3" in the customer number column 220, and a store ID "2" in the store ID column 222. The customer number "3" listed in column 220 lacks context in that it is unclear what the "3" means. However, the foreign-key relationship indicated at 226 can be thought of as providing context to the customer number "3". For instance, data table 208(1) includes a listing of all customer numbers in the customer number column 210. Further, each customer number is associated with a customer name on a row-by-row basis. A similar context is provided by data table 208(2) relative to store ID column 222 of data table 208(3). As such, in this example, data table 208(3) can be referred to as a fact table, while data tables 208(1) and 208(2) can be thought of as dimension tables. It is worth noting at this point that a given column can have a foreign-key relationship with only one other column. Further, foreign-key relationships are one way. Stated another way, for a pair of columns that have a foreign-key relationship the method can determine the roles of each of the two columns.

Methods for automatically identifying foreign-key relationships for a set of data tables can be very resource intensive. This fact can cause time delays that can lead to an unsatisfactory user experience, especially when performed in real-time. Some of the present implementations can employ techniques that reduce resource utilization while offering relatively high accuracy for the determined foreign-key relationships. Briefly, some implementations can reduce resource utilization when automatically determining foreign-key relationships. For example, some of these implementations can employ pruning techniques to eliminate unlikely candidate pairs. Some pruning techniques can employ pre-conditions that can be used to eliminate a significant number of candidate pairs while using a relatively small amount of computing resources.

The remaining candidate pairs can be evaluated relative to a set of constraints. This evaluation can further reduce the number of candidate pairs that are further processed. For instance, assume that column 210 and column 214 are identified as a candidate pair that passes the pruning process. Further assume that column 210 is subsequently identified as having a foreign-key relationship with a column (i.e., column 220) of data table 208(3). A constraint can be that a given column can only have one foreign-key relationship. In this scenario, a potential foreign-key relationship between columns 210 and 214 does not need further exploration since it would violate the constraint.

The candidate pairs that satisfy the constraints can be scored, such as by a similarity function. These candidate pairs can be ranked based upon their respective scores. Foreign-key relationships can then be determined from the ranked candidate pairs.

In summary, knowing the foreign-key relationships of set 202 allows much more information to be garnered from the set than would otherwise be possible. Several methods are described in more detail below for automatically determining foreign-key relationships for a set of data tables, such as set 202.

Example Foreign-Key Detection System

Figure 3:
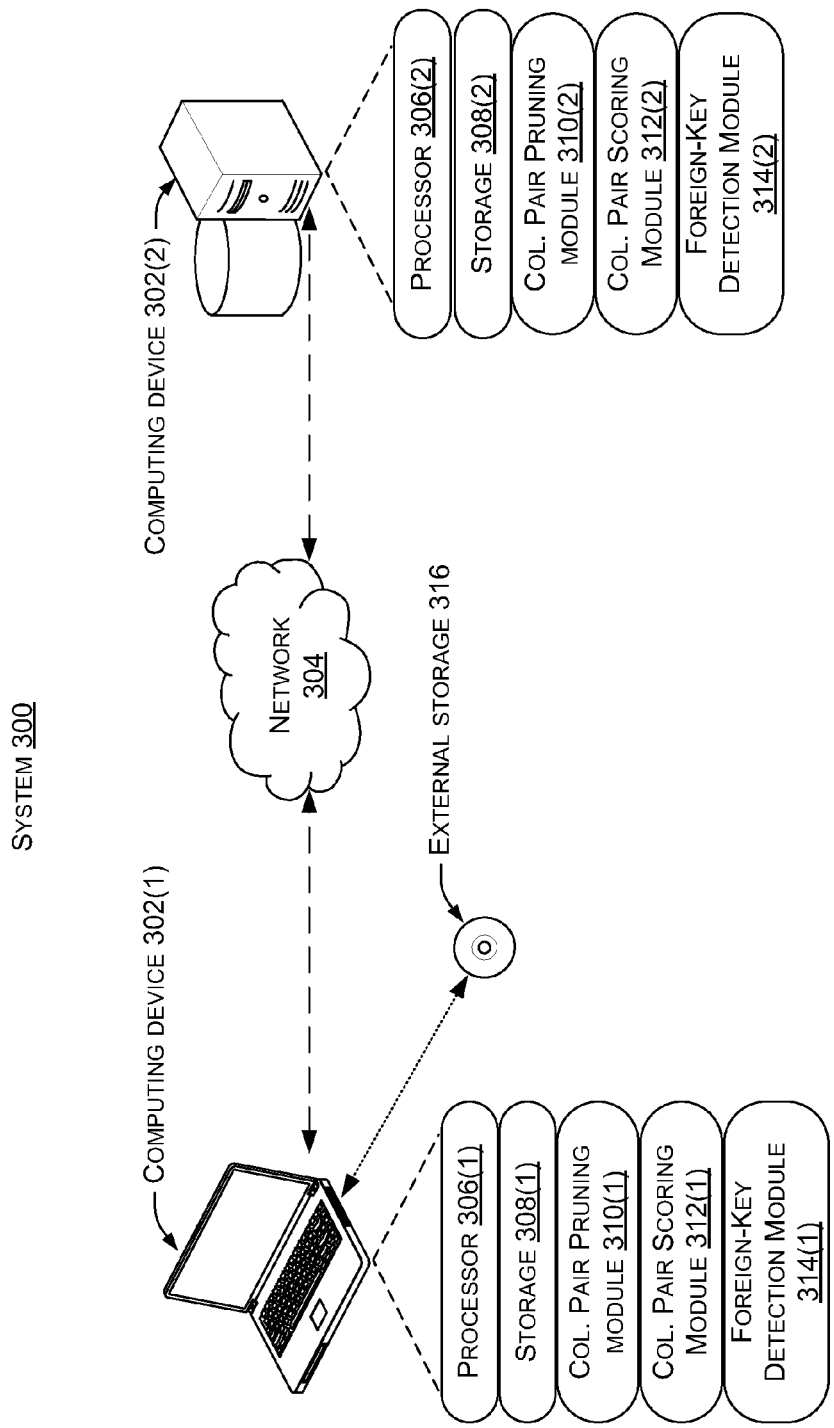

FIG. 3 shows a system 300 that is configured to accomplish the foreign-key detection concepts described above and below. In this case, system 300 includes first and second computing devices 302(1) and 302(2). The computing devices can exchange data over a network 304. Individual computing devices can function in a stand-alone or cooperative manner to achieve foreign-key detection.

In this case, each of computing devices 302(1) and 302(2) can include a processor 306, storage 308, a column pair pruning module 310, a column pair scoring module 312, and a foreign-key detection module 314.

Processor 306 can execute data in the form of computer-readable instructions to provide a functionality. Data, such as computer-readable instructions can be stored on storage 308. The storage can include any one or more of volatile or non-volatile memory, hard drives, and/or optical storage devices (e.g., CDs, DVDs etc.), among others. The computing devices can also be configured to receive and/or generate data in the form of computer-readable instructions from an external storage mechanism 316. Examples of external storage mechanisms can include optical storage devices (e.g., CDs, DVDs etc.), hard drives, and flash storage devices (e.g., memory sticks or memory cards), among others. The computing devices may also receive data in the form of computer-readable instructions over network 304 that is then stored on the computing device for execution by its processor.

Column pair pruning module 310 can be configured to identify potential foreign-key column pairs for a set of data tables. For instance, relative to set 202 of FIG. 2, the potential foreign-key pairs can include col. 210 to col. 218, col. 218 to col. 210, col. 210 to col. 220, col. 220 to col. 210, etc.

Further, the column pair pruning module 310 can be configured to distinguish a group of the column pairs that potentially have a foreign-key relationship from a remainder of the column pairs that cannot have a foreign-key relationship. Toward this end, column pair pruning module 310 can employ relatively low resource intensive techniques to identify potential foreign-key pairs (i.e. candidate pairs) that cannot actually be foreign-key pairs. For instance, the pruning module can utilize one or more pre-conditions to evaluate the foreign-key pairs.

Briefly, consider a candidate pair as column one and column two. For column one to act as a foreign-key for column two, all values in column two should be present in column 1. Thus, consider candidate pairs col. 220, col. 210 and col. 210, col. 220. In candidate pair col. 220, col. 210, for col. 210 to act as a foreign key for col. 220 then all values (i.e., "3" and "2") of col. 220 should be present in col. 210 (which includes values "1", "2", and "3"). So in this case the pre-condition is satisfied and this candidate pair is not pruned (at least based upon this pre-condition). In contrast, consider the opposite candidate pair of col. 210, col. 220 where col. 220 acts as a foreign-key for col. 210. Recall that 210 includes values "1", "2", and "3" while col. 220 includes only the values "3" and "2". In this case, the pre-condition fails because the value "1" is not contained in col. 220. Thus, the candidate pair of col. 220, col. 210 can be pruned. More detailed examples of pre-conditions are described below relative to FIG. 4.

Column pair scoring module 312 can score the remaining candidate pairs obtained from pruning module 310. For instance, the column pair scoring module can employ a scoring function to score the remaining candidate pairs. Examples of scoring functions are described below relative to FIGS. 4-6. Further, in some cases, the column pair scoring module can rank the remaining candidate pairs by their score.

In another implementation, the column pair scoring module 312 can be configured to operate on the group of the column pairs that potentially have a foreign-key relationship. The column pair scoring module may apply one or more constraints to the column pairs of the group to eliminate additional candidate pairs from further consideration. Examples of constraints are described below relative to FIGS. 4-6.

Foreign-key detection module 314 can obtain the scored and/or ranked candidate pairs from the column pair scoring module 312. The foreign-key detection module can determine the foreign-relationships of the set from the scored and/or ranked candidate pairs. Further examples for determining foreign-key relationships are described below relative to FIGS. 4-6.

As mentioned above, either of computing devices 302(1) and 302(2) can function in a stand-alone configuration. For instance, a set of data tables, such as set 202 of FIG. 2, could exist on computing device 302(1) (and/or external storage mechanism 316). In such a case, column pair pruning module 310, column pair scoring module 312, and foreign-key detection module 314, can provide the foreign-key detection functionality without communicating with network 304 and/or computing device 302(2). In such a case, a user of computing device 302(1) can fully enjoy the data with the foreign-key relationships as desired without regard to network availability and/or without relying on external resources.

In another scenario, the components and/or the set of data tables can be distributed. For instance, the set and the column pair pruning module 310(2), could exist on computing device 302(2) where initial pruning occurs. The set can then be sent to computing device 302(1) along with the remaining candidate pairs. Computing device 302(1) can then score the remaining candidate pairs and determine the foreign-key relationships for the set of data tables via column pair scoring module 312(1) and foreign-key detection module 314(1).

In still another scenario, computing device 302(1) can be a thin computing device with limited storage and/or processing resources. In such a case, processing and/or data storage can occur on computing device 302(2) (and/or upon a cloud of unknown computers connected to network 304). Results of the processing can then be sent to and displayed upon computing device 302(1) for the user.

The term "computing device" as used herein can mean any type of device that has some amount of processing capability. Examples of computing devices can include traditional computing devices, such as personal computers, cell phones, smart phones, personal digital assistants, or any of a myriad of ever-evolving or yet to be developed types of computing devices. Further, a system can be manifest on a single device or over multiple devices.

Foreign-Key Detection Method Example

Figure 4:
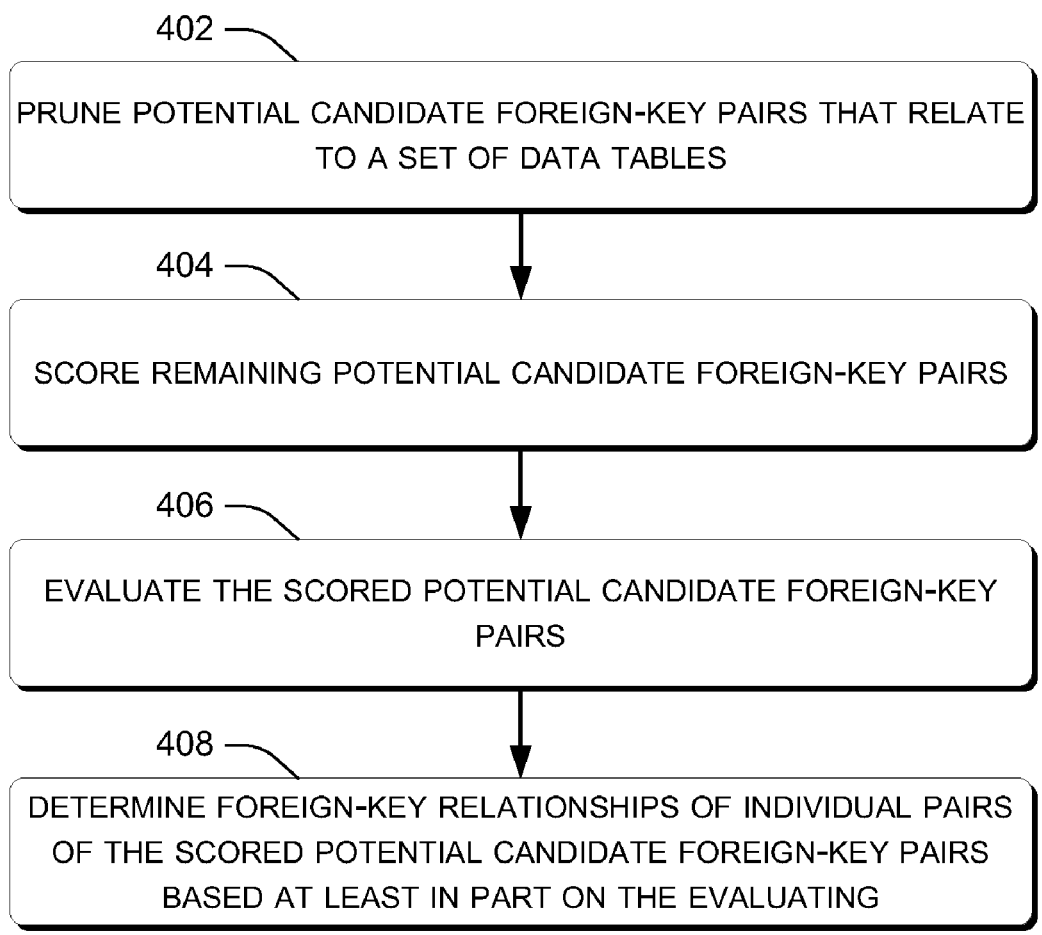
FIG. 4 shows a flowchart example of a foreign-key detection method in accordance with some implementations of the present concepts.

FIG. 4 illustrates a flowchart of a process, technique, or method 400 that is consistent with at least some implementations of the present foreign-key detection concepts.

Block 402 prunes potential candidate foreign-key pairs that relate to a set of data tables. The pruning applies at least one pre-condition to the potential candidate foreign-key pairs. Briefly, pre-conditions can be thought of as checks or tests that tend to hold true for legitimate potential candidate foreign-key pairs that can turn out to be actual foreign-key pairs and tend to be false for potential candidate foreign-key pairs that cannot be actual foreign-key pairs. Further, testing the pre-conditions tends to utilize a relatively low amount of resources. Pruning with pre-conditions is described in more detail below under the "pre-conditions" heading.

Block 404 scores the remaining potential candidate foreign-key pairs from block 402. For example, a scoring function can be applied to the remaining potential candidate foreign-key pairs. The scoring function can generate a relative score for individual remaining potential candidate foreign-key pairs. The relative scores can be used to rank the remaining potential candidate foreign-key pairs. Scoring remaining potential candidate foreign-key pairs is described in more detail below under the "scoring function" heading.

Block 406 evaluates the scored potential candidate foreign-key pairs. In one case, the evaluating applies one or more constraints to the remaining potential candidate foreign-key pairs to eliminate individual remaining potential candidate foreign-key pairs. This feature is described in more detail below under the "constraints" heading.

Block 408 determines foreign-key relationships of individual pairs of the scored potential candidate foreign-key pairs based at least in part on the evaluating. Examples of block 408 foreign-key pair determination is described below under the heading "partial graph exploration". In some cases, block 408 explores the scored candidates by descending rank (i.e., starting with the highest ranking pair). Such a configuration can save additional resources because a higher ranking pair can have a higher likelihood of actually having a foreign-key relationship. This can creates resource savings in that some or many of the pairs can be skipped from further exploring upon detection of an actual foreign-key relationship. For instance, recall that a given column can only have a foreign-key relationship with one other column. Once that foreign-key relationship is detected, any other column pairs that include those two columns need not be explored further.

Briefly, from a mathematical perspective, for a set of tables (a.k.a. nodes) V, a foreign-key relationship from node U to node V defines an edge between nodes U and V. The present methods seek to discover those foreign-key relationships of the set. Specifically, given the set of tables V, and two individual tables R, S∈V, these methods can identify a path (i.e. a sequence of edges) starting at R and ending at S which represents a foreign-key path. It is also worth noting that the path may also contain nodes in V other than R, S. In summary, for any two relations between tables R and S, the following discussion relates to several facets that are described in detail below.

Pre-Conditions

Pre-conditions can be utilized to conduct a preliminary low resource-usage evaluation of potential candidate pairs of the set. For instance, assume for purposes of explanation that the set includes table "R" that includes column "a" and table "S" that includes column "b". The candidate pair R.a and S.b will satisfy the pre-conditions if R.a and S.b are a legitimate candidate pair. If R.a and S.b cannot be a legitimate candidate pair then one or more of the pre-conditions will fail. In summary, a candidate pair that satisfies the pre-conditions may or may not turn out to have a foreign-key relationship, but a candidate pair that fails the pre-conditions cannot have a foreign-key relationship (i.e., is not a legitimate candidate pair). Thus, further system resources can be reserved for those candidate pairs that satisfy the pre-conditions.

Five non-limiting examples of pre-conditions are discussed below. Failure of a candidate pair to satisfy any one of these pre-conditions can indicate that the candidate pair is not a legitimate candidate pair. Accordingly, failure to satisfy the pre-condition(s) can allow the candidate pair to be pruned from further consideration.

One pre-condition that can be utilized relates to cardinality. Specifically, R.a's cardinality (i.e. number of distinct values in R.a) is less than or equal to S.b's cardinality. Stated another way, for S.b to act as a foreign-key for R.a then S.b must contain all values in R.a. For instance, consider again set 202 of FIG. 2. If rows of table 208(3) relate to individual transactions that occur at individual store IDs, then any store ID listed in a row of table 208(3) must be further defined in table 208(2) for a foreign-key relationship to exist. Stated another way, a store ID in a fact table becomes meaningless if that store ID is not further defined in a dimension table. Thus, a column that relates information to the store IDs will contain all of the store IDs referenced in the data table.

Another pre-condition that involves cardinality can be that the ratio of S.b's cardinality to table S's cardinality is greater than or equal to a pre-defined threshold. This threshold can be configurable. In some implementations, this threshold can be set to a high value, i.e. slightly below 1.0, to allow for some data errors/incompleteness. Some implementations can operate on the presumption that ideally S.b should be unique.

Still another pre-condition can be that S.b is not a floating point type. A further pre-condition can be that the data types of R.a and S.b must be compatible. For instance, if R.a comprises integers, then S.b should comprise integers. Another pre-condition can be that if R.a and S.b are of integer types, either one of the following is true:
  a. Similarity of R.a's column name and S.b's column name is greater than another pre-defined threshold
  b. Similarity of R.a's column name and S.b's table name is greater than still another pre-defined threshold.

In this instance, the similarity of two strings x and y can be defined as follows:
  a. Tokenize x as a set of tokens $\{x_1, x_2, \ldots, x_m\}$ (Tokenization procedure defined as follows)
  b. Tokenize y as a set of tokens $\{y_1, y_2, \ldots, y_n\}$
  c. For each token $y_i$, find the unmapped token $x_i$ such that a Jaro-Winkler score of $(x_i, y_i)$ is the highest. Map $x_i$ to $y_j$. Let $sim_j$=Jaro-Winkler score of $(x_i, y_i)$. Let $f_j$ be the fraction of columns whose name contains token $y_j$ if y is a column name, or the fraction of tables whose name contains token $y_j$ if y is a table name.
  d. Similarity of x and $$y = \frac{\sum_{j=1}^{n}\left(sim_j \times \ln\left(\frac{1}{f_j}\right)\right)}{\sum_{j=1}^{n} \ln\left(\frac{1}{f_j}\right)}.$$

The tokenization procedure for the above pre-condition can be as follows:
  a. Whitespace delimiters or symbols mark the boundary of tokens
  b. The change from small case to big case marks the boundary of tokens, for instance, in string "FooBar", the case change from 'o' to 'B' means that's the boundary.

Scoring Function

The scoring function can be used to rank candidates. A candidate <R.a, S.b> can be ranked, in some implementations, by a scoring function based on the following features, among others:
  a. s1: similarity of R.a's column name and S.b's column name
  b. s2: similarity of R.a's column name and S.b's table name
  c. s3: Mutual containment fraction between R.a's domain and S.b's domain
  d. s4: Whether R.a is a key or not In particular the scoring function can be a weighted combination of the above features and can have the following form:

w1×s1+w2×s2+w3×s3+w4×s4

One implementation can use w1=0.4, w2=0.4, w3=0.2, w4=−0.2 as the values for the above scoring function.

Constraints

Constraints can be used to eliminate additional candidate pairs. Stated another way, a candidate pair can be explained away, i.e. removed from consideration, by existence of other candidate pairs with significantly higher scores in the following cases that are explained by way of example in FIG. 4.

Figure 5:
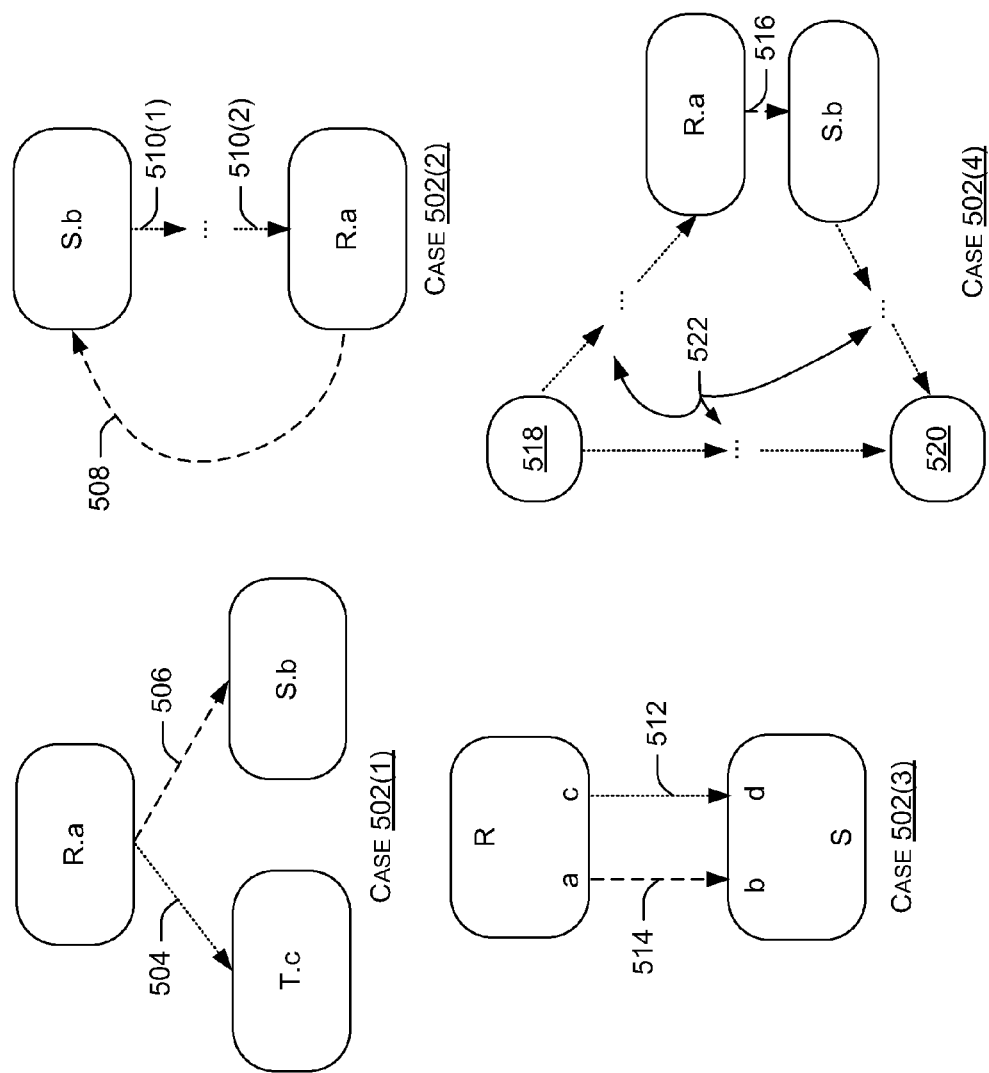
FIGS. 5-6 show examples of sets of data tables to which foreign-key detection can be applied in accordance with some implementations of the present concepts.

FIG. 5 shows four cases (case 502(1)-502(4)) that illustrate a candidate explain-away effect. In each case, dotted lines represent the candidate pairs with significantly higher scores for <R.a, S.b>. Dashed lines represent the candidate pairs <R.a, S.b> with significantly lower scores. The candidates with signifantly lower scores can be eliminated from further consideration.

In FIG. 5, the set of candidate pairs marked with dotted lines is called the conflict set for candidate <R.a, S.b>. Thus, in case 502(1) dotted line 504 represents a potential foreign-key relationship between R.a and T.c. Dashed line 506 represents a potential foreign-key relationship between R.a and S.b. Case 502(1) enforces the constraint that there cannot be more than one foreign-key (i.e., dotted line 504) outgoing from a given column (R.a in this example).

Case 502(2) shows that adding an edge (dashed line 508) that would create a cycle in the FK relationship graph is not allowed. In this case, dotted lines 510(1) and 510(2) show a relatively high scoring relationship between S.b and R.a. Stated another way, a fact table can have a foreign-key relationship with a dimension table that then has a foreign-key relationship with a second dimension table. However, the dimension table cannot have a foreign-key relationship back to the fact table that creates a cyclic relationship between the two tables.

Case 502(3) enforces the constraint that foreign-key relationship between a pair of tables must be single column (i.e. no multi-column foreign-key relationships allowed). Thus, with the existence of dotted line 512 between R.c and S.d, the dashed line 514 between R.a and S.b can be eliminated.

In Case 502(4) addition of the edge <R.a, S.b> (indicated as dashed line 516) results in an alternative path between the two tables shown as square boxes 518 and 520, however this edge <R.a, S.b> has a significantly lower score than all other edges indicated by dotted lines designated generally at 522. In such a case, <R.a, S.b> can be eliminated from further consideration.

Partial Graph Exploration

Recall that data tables of a set can be thought of as a graph where foreign-key relationships are analogous to specific edges of the graph. The idea of partial graph exploration is to help avoid exploring certain edges in the graph. Stated another way, edge exploration can identify foreign-key paths. However, edge exploration can be resource intensive. Thus, some of the implementations can reduce the number of edges that are explored while still identifying foreign-key relationships of the set of tables. For example, given a set of tables that includes tables R, S, as well as other tables, some implementations simply focus on the candidates connecting R and S.

Figure 6:
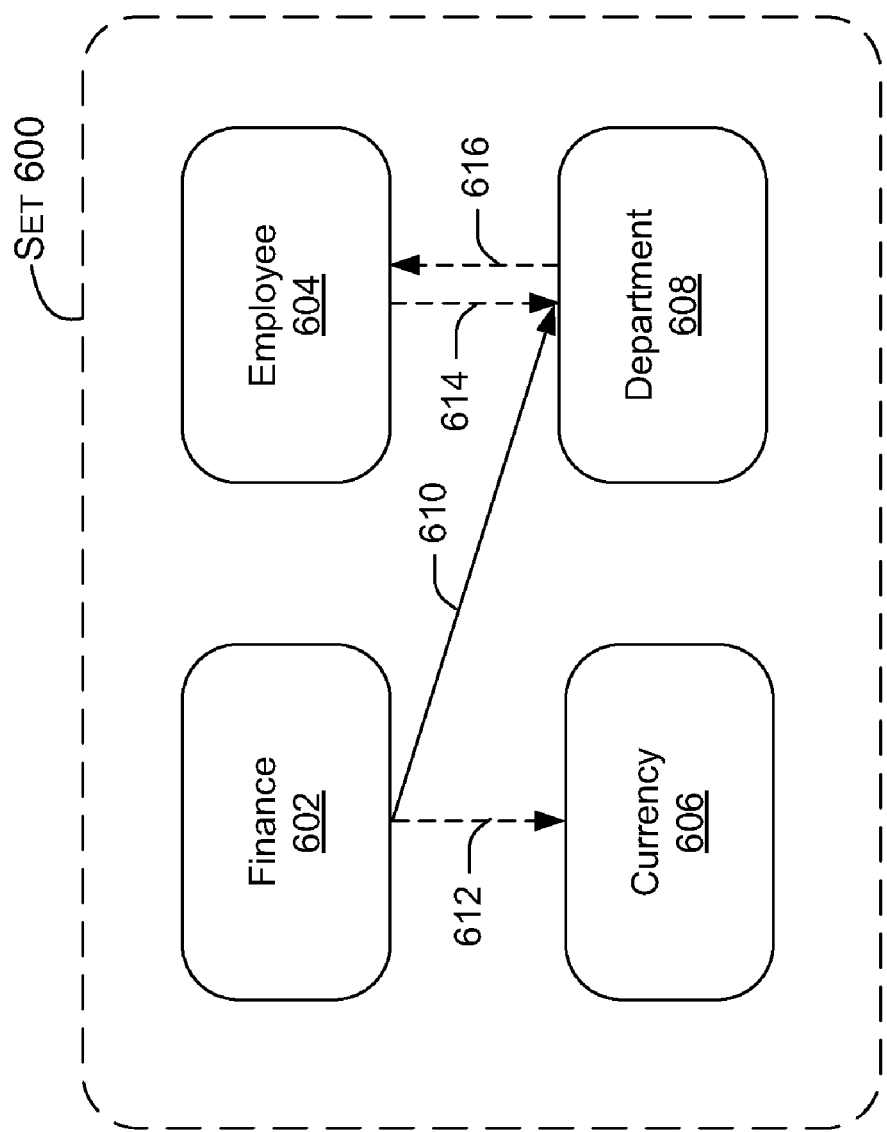

For purposes of explanation consider FIG. 6 which shows a set 600 that includes a finance table 602, an employee table 604, a currency table 606, and a department table 608. Arrow 610 represents a potential foreign-key relationship between finance table 602 and department table 608. Arrow 612 represents a potential foreign-key relationship between finance table 602 and currency table 606. Arrow 614 represents a potential foreign-key relationship between employee table 604 and department table 608 and arrow 616 represents a potential foreign-key relationship between department table 608 and employee table 604. In this case, if table R=finance table 602 and Table S=department table 608, some implementations only need to focus on the candidate (i.e., arrow 610) from a column Finance.DepartmentId of finance table 602 to a column Department.DepartmentId of department table 608 due to the high similarity. Stated another way, column name similarity can be utilized to guide exploration of specific candidate pairs over other candidate pairs. This strategy can avoid resource utilization associated with exploring arrows 612-616.

Algorithm

---

Initialization
The following discussion relates to an example algorithm that can be used for automatic foreign-key detection.
1) The algorithm can eliminate all pairs <R.a, S.b> which violate one or more pre-conditions. The remaining pairs can be thought of as legitimate candidate pairs.
2) The legitimate candidate pairs can be placed in a list L and sorted by decreasing order of score. Each candidate in sorted list L has a state, which can be one of {VerifiedTrue, VerifiedFalse, Pruned, None}. Initialize all the states as None.
   Main routine for Foreign-Key detection between R, S.
   Pre-condition: Initialization step has been called.
   Input: Tables R and S
   Output: A set of foreign-key relationships that start from R and end at S.
3) Loop
   a. Let SG = ConnectingSubgraph(R, S)
   b. AllTrue = VerifyAllTrue(SG)
   Until AllTrue or SG is empty
4) Output SG
Subroutine ConnectingSubgraph(R, S)
   a. Initialize an empty graph G
   b. For each candidate C in the sorted list L produced in step 1.b,
      i. If C's state is VerifiedTrue or None, add C as an edge to G
      ii. if G contains both R and S as nodes, break the loop
   c. For each edge e in G, if there is a path from some R to S, and e is in that path, then mark e
   d. Return the set of edges marked in step c.
Subroutine VerifyAllTrue(SG)
   a. For each candidate C in SG
      i. Let CS = conflict set of C
      ii. if CS is empty
          then if VerifyContainment(C) is true
             then do the following
                (1) Mark C's state as VerifiedTrue
             else do the following
                (1) Mark C's state as Verified False
                (2) Return false
          else if VerifyAllTrue(CS) is true
             then do the following
                (1) Mark C's state as Pruned
                (2) Return false
             else do the following
                (1) Return false
      iii. Return true
Subroutine VerifyContainment(C)
   a. If C's state is VerifiedTrue return true
   b. If Ra's cardinality and S.b's cardinality is larger than a pre-defined threshold, do the following
      i. Probe a random sample of R.a, if the fraction of failed probe is greater than a pre-defined threshold, return false
      ii. Compare the hash signatures of R.a and S.b, if the fraction of signatures H(R.a) > H(S.b) is greater than a threshold, return false
   c. Do a full join to find out the fraction of values in R.a which are not contained in S.b, if the fraction is greater than a pre-defined threshold, return false, otherwise return true

---

Extension to Set of Tables <F, D>

Given two set of tables F and D, for each table R in F and each table S in D, run the above main routine for <R, S>. Union all the output relationships of each pair, that is the output for <F, D>.

The above algorithms offer examples of methods for determining foreign-key relationships between columns of data tables of a set.

The order in which the above described methods are described is not intended to be construed as a limitation, and any number of the described blocks or acts can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device causes the method to be performed.

To summarize, the above description relates to determining foreign-key relationships between columns of data tables of a set. Some implementations can utilize pruning criteria to automatically eliminate a large number of unlikely candidate pairs. These implementations can then utilize a scoring function to rank the remaining candidates. The implementations can identify a path (sequence of edges) between the given pair of tables. In some cases the paths can be identified in an efficient manner that can be timely accomplished for the user.

CONCLUSIONS

Although techniques, methods, devices, systems, etc., pertaining to determining foreign-key relationships between columns of data tables of a set are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A system comprising:
a column pair pruning module configured to identify column pairs from a set of data tables and further configured to distinguish at least an individual column pair that potentially has a foreign-key relationship from a remainder of the column pairs that cannot have foreign-key relationships, wherein the individual column pair comprises a first column from a first table and a second column from a second table, the first column having a first column name with multiple first tokens and the second column having a second column name with multiple second tokens;
a column pair scoring module configured to operate on the individual column pair that potentially has the foreign-key relationship and further configured to determine a ranking score indicating a relative likelihood that the individual column pair has an actual foreign-key relationship, wherein the ranking score for the individual column pair is computed based on multiple token similarity scores reflecting similarity of individual first tokens from the first column name to similarity of individual second tokens from the second column name;
a foreign-key detection module configured to identify whether the first column and the second column have the actual foreign-key relationship based, at least in part, on the ranking score; and
a processor configured to execute at least one of the column pair pruning module, the column pair scoring module, or the foreign-key detection module.

2. The system of claim 1, wherein the column pair pruning module is configured to apply a set of pre-conditions to the column pairs to identify the remainder of the column pairs that cannot have the foreign-key relationships.

3. The system of claim 1, wherein the column pair scoring module is configured to apply at least one constraint to another individual column pair and to eliminate the another individual column pair based upon the at least one constraint.

4. The system of claim 1, wherein the foreign-key detection module is further configured to:
rank the individual column pair relative to other individual column pairs having other ranking scores to obtain ranked column pairs; and
identify an individual ranked column pair that has the actual foreign-key relationship.

5. The system of claim 1, wherein the column pair scoring module is further configured to determine the ranking score based on a weighted linear combination of:
string similarities computed using the multiple token similarity scores, and other features of the individual column pair.

6. The system of claim 5, wherein the other features comprise a mutual containment fraction of a first domain of the first column and a second domain of the second column.

7. The system of claim 6, wherein the other features comprise:
similarity of the first column name to a name of the second table.

8. A computer-readable memory device or storage device having instructions stored thereon that, when executed by a computing device, cause the computing device to perform acts, the acts comprising:
obtaining a set of data tables, the set of data tables including a first data table comprising a first column having a first column name and a second data table comprising a second column having a second column name that is not the same as the first column name; and,
automatically determining whether the first column and the second column have a foreign-key relationship by:
tokenizing the first column name and the second column name to obtain a tokenized first column name and a tokenized second column name,
applying a string similarity function to the tokenized first column name and the tokenized second column name to obtain a string similarity reflecting multiple token similarities of multiple first tokens of the tokenized first column name to multiple second tokens of the tokenized second column name, and
applying a scoring function using the string similarity to determine whether the first column and the second column have the foreign-key relationship.

9. The computer-readable memory device or storage device of claim 8, wherein the first column and the second column comprise an individual candidate column pair from a plurality of candidate column pairs.

10. The computer-readable memory device or storage device of claim 9, wherein the automatically determining comprises:
pruning other individual candidate column pairs from the plurality of candidate column pairs, and
applying a set of constraints to non-pruned candidate column pairs from the plurality of candidate column pairs to eliminate some of the non-pruned candidate column pairs that do not have foreign-key relationships.

11. The computer-readable memory device or storage device of claim 10, wherein the automatically determining comprises scoring other non-pruned candidate column pairs using the scoring function.

12. The computer-readable memory device or storage device of claim 11, wherein the automatically determining comprises ranking the individual candidate column pair relative to the other non-pruned candidate column pairs using the scoring function.

13. The computer-readable memory device or storage device of claim 12, wherein the automatically determining further comprises determining the multiple token similarities on a token-by-token basis.

14. A method comprising:
obtaining a set of data tables, the set of data tables including a first data table comprising a first column having a first column name and a second data table comprising a second column having a second column name that is not the same as the first column name; and,
automatically determining whether the first column and the second column have a foreign-key relationship by:
tokenizing the first column name and the second column name to obtain a tokenized first column name comprising multiple first tokens and a tokenized second column name comprising multiple second tokens,
computing token similarities reflecting similarity between individual first tokens and individual second tokens,
computing a fraction of columns in the set of data tables with names containing the individual first tokens or the individual second tokens,
using both the token similarities and the fraction of columns in a single mathematical function to compute a string similarity reflecting similarity of the first column name to the second column name, and
applying a scoring function to the string similarity to determine whether the first column and the second column have the foreign-key relationship,
wherein at least the automatically determining is performed by a computing device.

15. The method of claim 14, wherein the scoring function comprises a weighted combination of the string similarity and other features.

16. The method of claim 15, wherein the other features comprise:
another string similarity reflecting similarity of the first column name to a name of the second table,
a mutual containment fraction between a first domain of the first column and a second domain of the second column, and
an indication of whether the first column is a key.

17. The method of claim 14, wherein the token similarities are computed as Jaro-Winkler scores.

18. The method of claim 14, further comprising applying the scoring function to other pairs of columns from the set of data tables and ranking the first column and second column as a candidate foreign-key pair relative to the other pairs of columns.

19. The method of claim 14, further comprising identifying a whitespace delimiter in the first column name that marks a boundary between two of the individual first tokens.

20. The method of claim 14, further comprising identifying a change from lower case to upper case in the first column name that marks a boundary between two of the individual first tokens.

* * * * *